Aug. 7, 1951 W. U. ZELLER 2,563,148

FILM REEL COMBINATION

Filed Feb. 3, 1949

INVENTOR.
Wilbur U. Zeller
BY Mc Laughlin + Wallenstein
atty.

Patented Aug. 7, 1951 2,563,148

UNITED STATES PATENT OFFICE 2,563,148

FILM REEL COMBINATION

Wilbur U. Zeller, Chicago, Ill., assignor to Micro Equipment Corporation, Chicago, Ill., a corporation of Illinois Application February 3, 1949, Serial No. 74,345

4 Claims. (Cl. 242—70)

My invention relates to an improved film reel and more in particular to the combination of a film reel with a shaft for carrying the same.

Film reels or spools conventionally employed in the industry have become more or less standardized and, in general, comprise stampings in which the side plates of the reels are dissimilar in some respects and in which attachment to a shaft is secured by one member and keying on the shaft is secured by another member. This type of construction has been developed to provide for simplicity and ease of attachment and detachment, and also to reduce costs, it being known that a very large number of reels is employed yearly. For certain purposes, conventional reels and reel and shaft combinations are not suitable. In the device shown in my copending application, Serial No. 62,767, filed November 30, 1948, for example, the usual type of reel and shaft cannot be used to advantage for many reasons.

The object of my invention is the provision of an improved film reel together with an improved shaft with which it may be used in combination, particularly adapted for use with equipment of the type disclosed in my copending application above identified.

In the accompanying drawings, I have illustrated a preferred form of my invention, in which.

Figure 1:
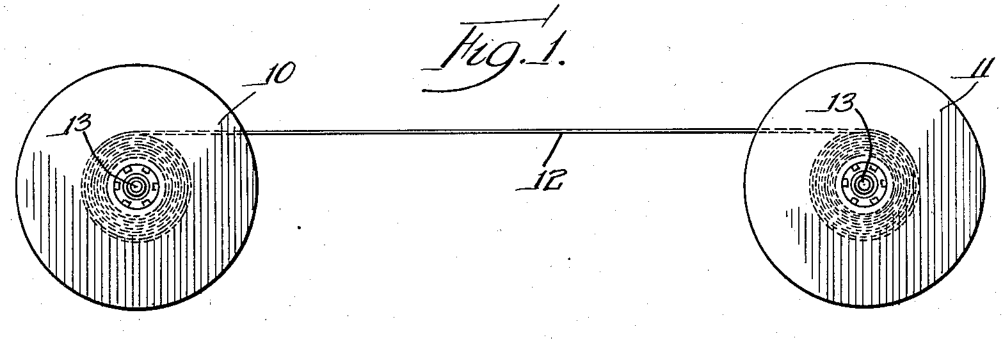
Fig. 1 is an elevational view indicating the manner in which the reels and shafts of my invention may be employed for both supply and take-up.
Figure 2:
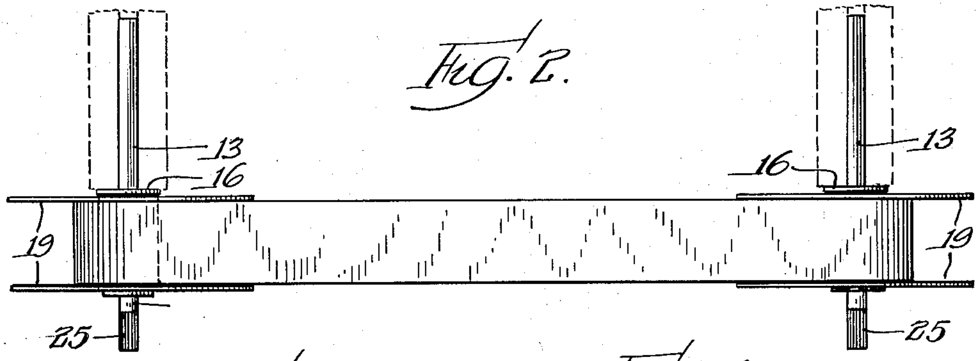
Fig. 2 is a plan view of Fig. 1.
Figure 3:
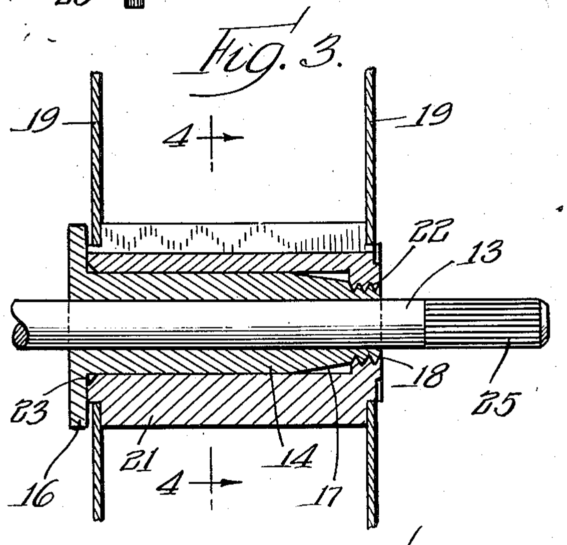
Fig. 3 is an enlarged fragmentary sectional view taken through the axis of the reel shaft.
Figure 4:
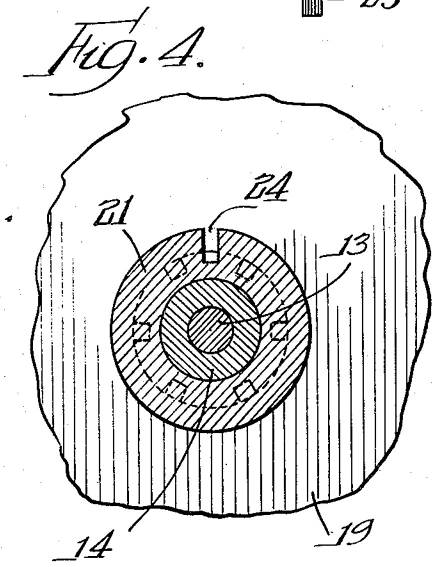
Fig. 4 is a sectional view taken on the line 4—4 of Fig. 3.
Figure 5:
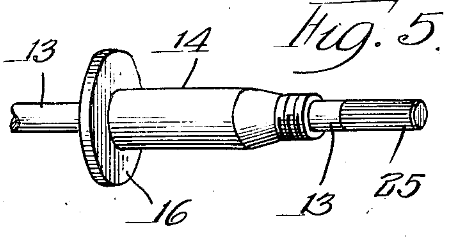
Fig. 5 is a perspective view showing the shaft and adapter forming a part thereof.

Referring now to the drawings, I indicate in Figs. 1 and 2 a supply reel 10 and a take-up reel 11 with film 12 between them and approximately fed half-way from the supply to the take-up reel. In these two figures the installation is indicated only generally and somewhat schematically, it being understood that in most instances at least, the film 12 would not run directly from the supply to the takeup reel. It should be noted also that in the art the terms spool and reel are sometimes employed to have a specific meaning, but I am employing the word reel throughout as if the terms were completely equivalent.

The shaft comprises a regular shaft portion 13 which is suitably journaled in the usual types of bearings provided for it and which may be driven where desired, and an adapter 14 which is frictionally held on the shaft portion 13 intermediate its ends. The adapter 14 has an annular flange portion 16 and a tapered portion 17 leading to external threads 18.

The reel comprises side plates 19 which are centrally apertured to receive reduced portions of a solid hub 21. The reduced portions are riveted or pinned over sufficiently to hold the side plates 19 firmly on the hub. The internal diameter of the reel is uniform except for a threaded portion 22 of reduced diameter at one end and a chamfered portion 23 at the other end. Thus the chamfer 23 and tapered portion 17 cooperate to guide the reel into position, and by turning the reel with respect to the shaft, the threads are engaged and the end of the hub is brought into contact with the annular flange 16.

The hub 21 is completely solid except for a transverse kerf or slot 24 into which an articulated end of a film strip may be extended.

Depending upon the direction of movement of the film, the threads 18 and 22 may be left-hand or right-hand, but whichever they are, they may be standard, that is to say, all threaded in the same direction so that the same reel may be both a takeup and supply reel. Looking at Fig. 1, for example, if we assumed that the film 12 was being drawn away from the supply reel 10 and the shaft of the latter was being braked, the tendency would be to increase the firmness of the engagement between the reel and adapter. Under these conditions we would also assume that the shaft supporting reel 11 was being driven through a friction clutch at a rate of speed somewhat more than that required to take up the film. Under such conditions, the engagement between this reel and its shaft would always become greater.

The shaft 13 has a knurled end 25 by means of which the shaft can be grasped and turned. When the reel is placed on the shaft, it may be desirable to engage the thread without turning the reel. With this construction the reel can be held stationary, and the shaft turned slightly to effect engagement.

While my invention is of a specific detailed nature, it offers a valuable addition to the field in which it falls, and its scope is defined by the claims.

I claim:

1. A reel and shaft combination, comprising a shaft, an adapter secured over the shaft with an annular flange at one end thereof and a tapered portion at the other end, the adapter being threaded at the smaller part of the tapered portion, and a reel comprising a hub and side plates, the hub having an internal diameter to fit the adapter, and a narrowed threaded portion, the longitudinal dimension of the hub being such that when the threads between the adapter and hub are engaged the hub engages against the said flange.

2. A reel and shaft combination, comprising a a shaft, an adapter secured over the shaft with an annular flange at one end thereof and a tapered portion at the other end, the adapter being threaded at the smaller part of the tapered portion, and a reel comprising a hub and side plates, the hub having an internal diameter to fit the adapter, and a narrowed threaded portion, the longitudinal dimension of the hub being such that when the threads between the adapter and hub are engaged the hub engages against the said flange, said hub having a beveled edge cooperating with said tapered portion to guide the reel onto the adapter.

3. A reel and shaft combination, comprising a shaft, an adapter secured over the shaft with an annular flange at one end thereof and a tapered portion at the other end, the adapter being threaded at the smaller part of the tapered portion, and a reel comprising a hub and side plates, the hub having an internal diameter to fit the adapter, and a narrowed threaded portion.

4. A reel and shaft combination, comprising a shaft, an adapter secured over the shaft with a tapered portion at one end thereof, the adapter being threaded at the smaller part of the tapered portion, a reel comprising a hub and side plates, the hub having an internal diameter to fit the adapter, and a narrowed threaded portion, and a stop on the adapter against which the reel hub engages when the reel is threaded on the adapter.

WILBUR U. ZELLER.

REFERENCES CITED

The following references are of record in the file of this patent:

UNITED STATES PATENTS

| Number | Name | Date |
|---|---|---|
| 1,991,853 | Howell | Feb. 19, 1935 |
| 2,087,002 | Miehle | July 13, 1937 |
| 2,146,835 | Merwin | Feb. 14, 1939 |

FOREIGN PATENTS

| Number | Country | Date |
|---|---|---|
| 318,020 | Italy | May 30, 1934 |
| 685,641 | France | Apr. 1, 1930 |